(12) United States Patent
Hayakawa et al.

(10) Patent No.: US 7,154,712 B2
(45) Date of Patent: Dec. 26, 2006

(54) WIRE SUPPORT MEMBER AND ROTARY DISK STORAGE DEVICE

(75) Inventors: Satoshi Hayakawa, Kanagawa (JP); Eiji Soga, Kanagawa (JP); Takeshi Chawanya, Kanagawa (JP); Kohichi Takeuchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 378 days.

(21) Appl. No.: 10/821,417

(22) Filed: Apr. 9, 2004

(65) Prior Publication Data

US 2004/0240118 A1    Dec. 2, 2004

(30) Foreign Application Priority Data

May 29, 2003 (JP) .............................. 2003-152407

(51) Int. Cl.
*G11B 5/55* (2006.01)
(52) U.S. Cl. ................................ 360/265.9; 360/264.2
(58) Field of Classification Search ............ 360/264.2, 360/265.9, 266, 245.8, 245.9
See application file for complete search history.

(56) References Cited

U.S. PATENT DOCUMENTS

| | | | |
|---|---|---|---|
| 5,012,368 A * | 4/1991 | Bosier et al. ............ | 360/264.2 |
| 5,103,359 A * | 4/1992 | Marazzo ................. | 360/264.2 |
| 5,909,342 A * | 6/1999 | Forbord et al. .......... | 360/264.2 |
| 5,991,123 A * | 11/1999 | Casey ..................... | 360/264.2 |
| 6,754,045 B1 * | 6/2004 | Korkowski et al. ...... | 360/245.9 |
| 6,940,697 B1 * | 9/2005 | Jang et al. ............... | 360/264.2 |
| 7,054,110 B1 * | 5/2006 | Nakamura et al. ....... | 360/264.2 |

* cited by examiner

*Primary Examiner*—R. S. Tupper
(74) *Attorney, Agent, or Firm*—Townsend and Townsend and Crew LLP; Rambod Nader

(57) ABSTRACT

One feature of the invention is to support a wiring structure on a side surface of an actuator arm used in a magnetic disk device so as not to allow fluttering to occur. In one embodiment, a wire support member 102*a* used in a magnetic disk device includes a protruding wall 108*a* provided with an opposing surface facing a wiring structure 90*a* and protruding in a width direction, and a protruding wall 110*a* provided with an opposing surface facing the wiring structure 90*a* and protruding in a width direction. The wire support member 102*a* is provided with a fixing area for accommodating the wiring structure between the opposing surface of the protruding wall 108*a* and the opposing surface of the protruding wall 110*a*. The wire support member 102*a* is further provided with an open area adjoining the fixing area at a longitudinal end portion of the protruding wall and includes protruding walls 328, 330, 332 each having an opposing surface facing the wiring structure.

20 Claims, 12 Drawing Sheets

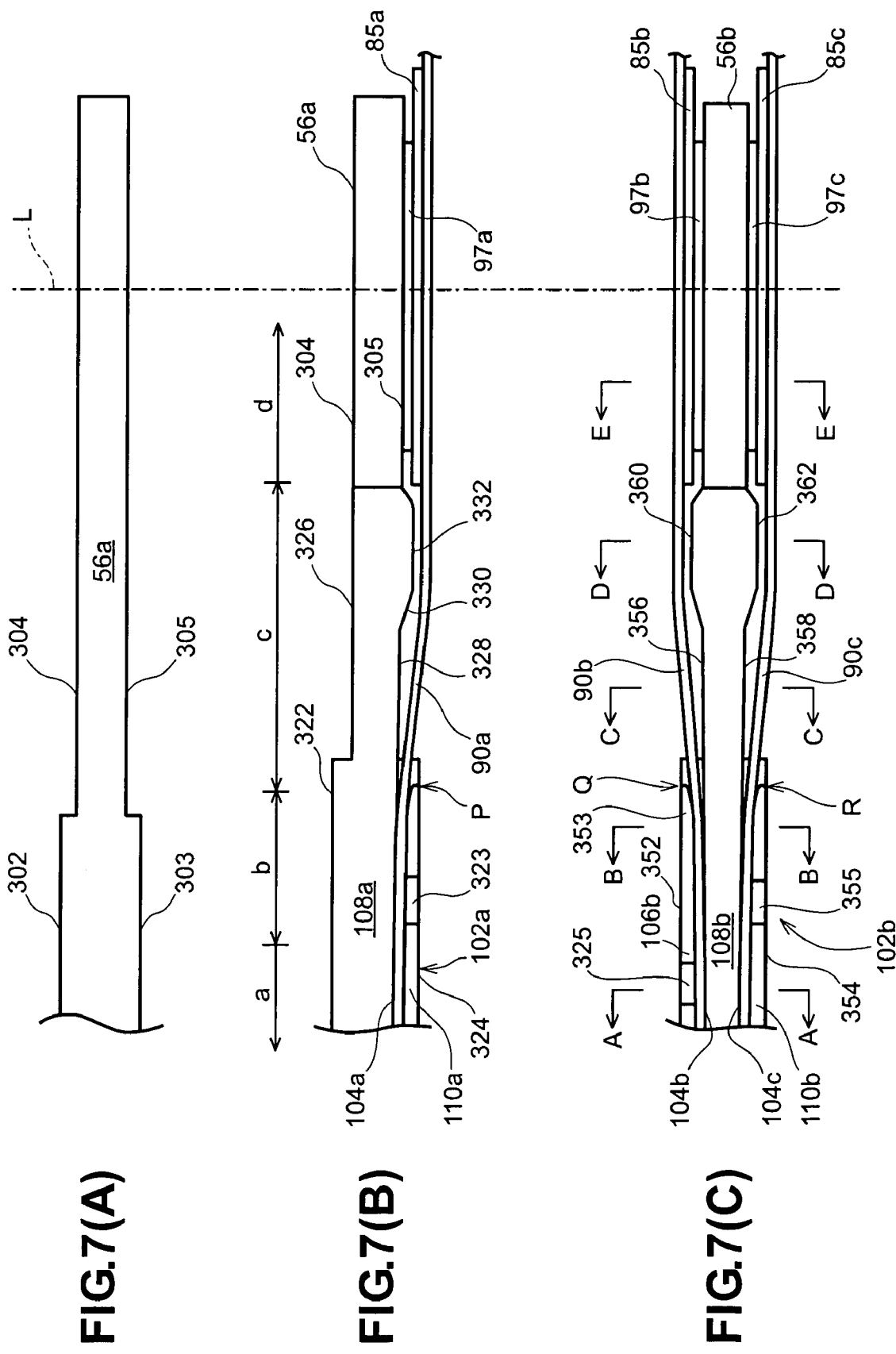

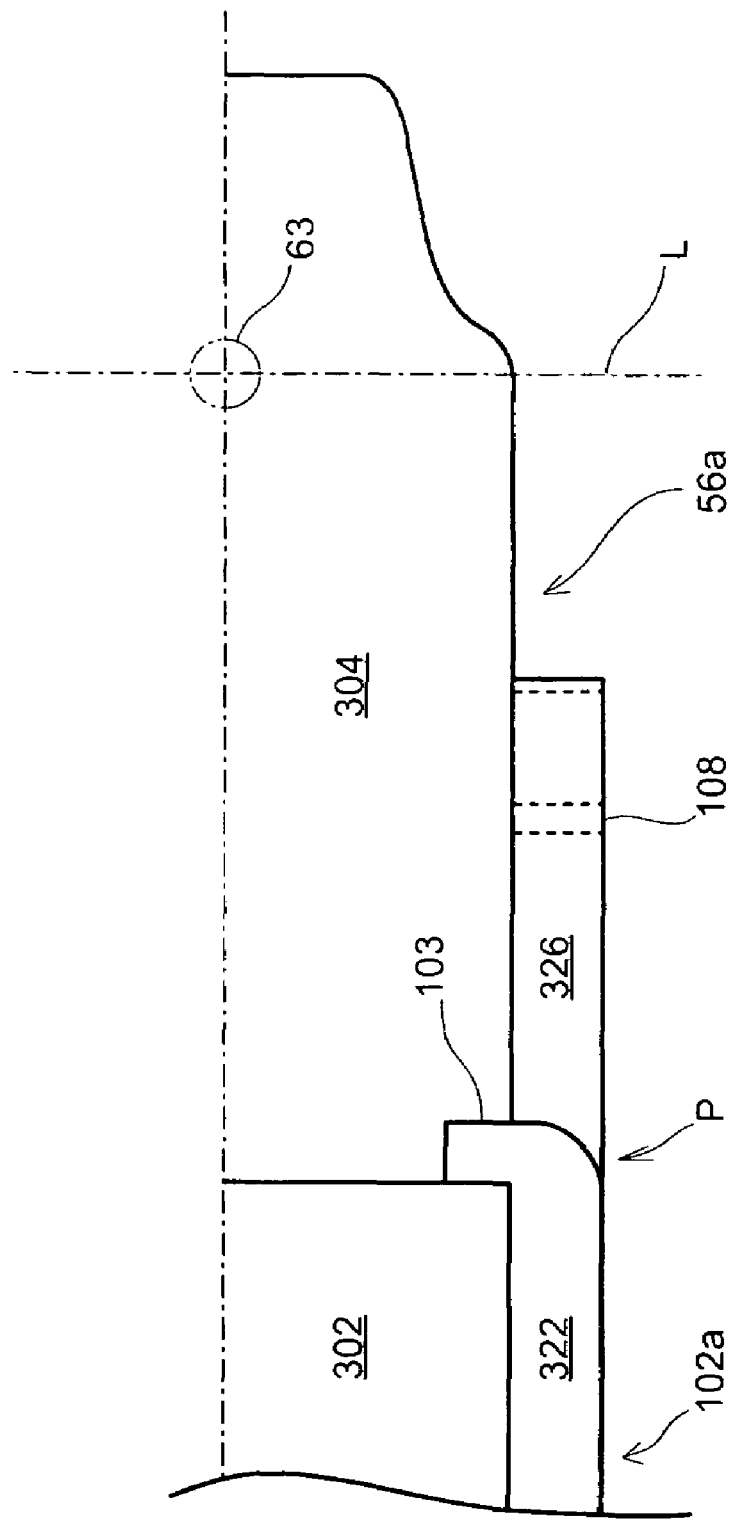

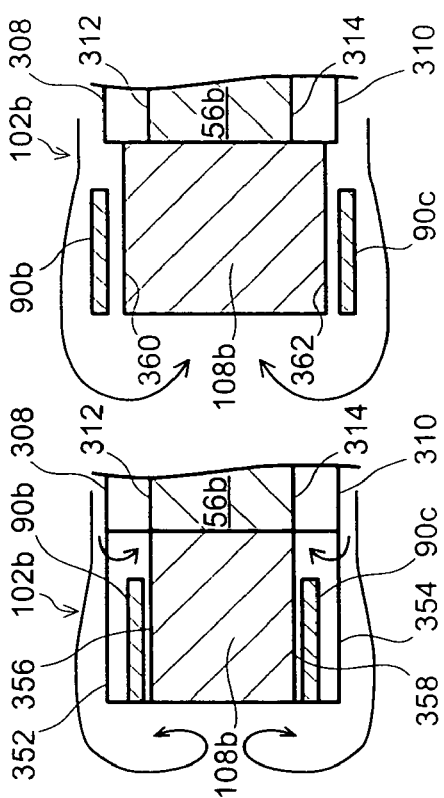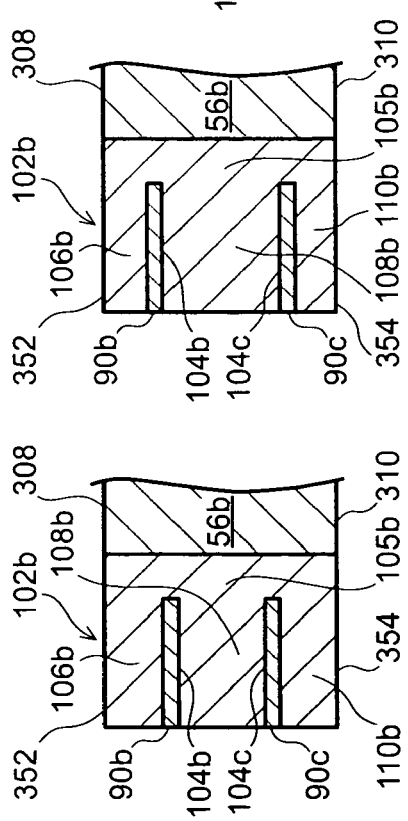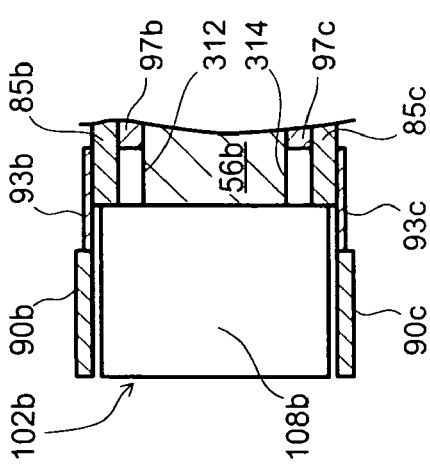

WIRE SUPPORT MEMBER AND ROTARY DISK STORAGE DEVICE

BACKGROUND OF THE INVENTION

The present invention relates to techniques for preventing vibrations of a head suspension assembly used in a rotary disk storage device, such as a magnetic disk device or an optical disk device, and more particularly, to a technique for preventing fluttering of the head suspension assembly resulting from an air flow generated on a surface of a rotating disk.

In the rotary disk storage device, a disk as a recording medium is rotated at a high speed to generate an air flow on a surface thereof. This gives a slider mounted with a head for reading and writing data an ascending force, resulting in the slider floating above the surface of the disk. While data is being read or written, the air flow generated on the surface of the disk collides with an actuator arm, a load beam, a flexure, the slider, and the like located above the surface of the disk, producing an oscillation called a fluttering in these components.

Fluttering must be suppressed as much as possible, since fluttering eventually gives the slider irregular oscillations, thus degrading a servo control function for a tracking operation. Examples of conceivable various portions that could cause fluttering resulting from the effect of an air flow include an opening defined in a load beam. Fluttering caused by this opening is described in, for example, Japanese Patent Laid-open No. 2002-279745.

With the recent trend toward a greater recording capacity of disks, a track pitch has become narrower and narrower. This calls for an even greater performance in tracking operations of the head. As a result, a need arises for taking measures against types of fluttering that have not so far presented any big problems.

FIG. 1 shows a state in which wires are supported in a conventional actuator head suspension assembly 10. The actuator head suspension assembly 10 includes an actuator assembly and head suspension assemblies 18a to 18f connected to the actuator assembly. The actuator assembly is composed of a pivot bearing 11, a coil support 14, a voice coil 16, and actuator arms 12a to 12d. Each of the head suspension assemblies 18a to 18f is composed of a load beam, a flexure, and a slider (not shown). The slider is mounted to the flexure at a leading end portion of the head suspension assembly and a head is attached to the slider.

Four actuator arms 12a to 12d are laminated one on top of another. One head suspension assembly is attached to each of the topmost actuator arm 12a and the bottom actuator arm 12d. Two head suspension assemblies are attached to each of the two actuator arms 12b, 12c laminated on an inner side between the topmost and bottom actuator arms 12a, 12d.

Wire support members 13a to 13d each having a slit formed therein are respectively mounted to the respective side faces of the actuator arms 12a to 12d. Wires connected to the associated heads are inserted and secured in the slits of the wire support members on the side faces of the actuator arms 12a to 12d, being led to a position near the pivot bearing 11.

First of all, terminology relating to the actuator arm applicable throughout this specification will be explained with reference to FIG. 13. FIG. 13 is a diagram illustrating schematically an actuator arm 500 as viewed from a head side, and represents a cross section taken along the same line as that of the actuator arm 12a in FIG. 1 taken along arrows A—A.

A face 501 and a face 503 are faces located in a vertical direction of a device when the actuator arm is actually mounted in the device, each of the faces being referred to as a front surface. A face 505 and a face 507 are side faces located in a rotating direction of the actuator assembly. The face 505 is a surface close to the disk when the actuator arm is actually mounted in the device, being referred to as an inner side surface. The face 507 is a surface close to a side wall of a housing, being referred to as an outer side surface. The interval between the front surface 501 and the front surface 503 is referred to as an actuator arm thickness.

A face 509 divides the actuator arm thickness defined by the front surface 501 and the front surface 503 into two, being referred to as a central surface. An up-and-down direction indicated by arrows X running substantially perpendicular to the central surface is referred to as a vertical direction. A right-and-left direction indicated by arrows Y running substantially perpendicular to the outer side surface or the inner side surface is referred to as a lateral direction. A direction perpendicular to the cross section shown in FIG. 13 is referred to as a longitudinal direction of the actuator arm or the actuator head suspension assembly. This longitudinal direction may also be used in terms of the wire support member. Incidentally, the front surface, outer side surface, and inner side surface of the actuator assembly may not necessarily be a flat surface in a strict sense of the word. These surfaces may have projections and depressions, or may have slants and curvatures. In addition, when referring to the actuator head suspension assembly in the longitudinal direction, a side of the head is referred to as a leading end side, while a side of the pivot bearing is referred to as a supporting end side. The same terminology is used to refer to positional relations of the wire support member and the head suspension assembly, as may be necessary.

FIG. 2(A) is a schematic cross-sectional view taken along arrows A—A in FIG. 1 as viewed from the leading end side. FIG. 2(A) illustrates the wire support members 13a to 13d mounted, respectively, on the outer side surfaces of the actuator arms 12a to 12d. A slit provided with a face open in the lateral direction is formed in each of the wire support members 13a and 13d. Similarly, two slits, each having the same face open in the lateral direction as that formed in each of the wire support members 13a and 13d, are formed in each of the wire support members 13b and 13c. Wires 20a to 20f are inserted and secured in the associated slits.

A back surface located opposite to the slit open surface of each wire support member is bonded to the outer side surface of each of the corresponding actuator arms. Air generated from a rotating disk flows to the two front surfaces of each actuator arm. The wires 20a to 20f can never be affected by the air flow to develop fluttering, since the wires 20a to 20f are inserted and secured in the slits of the wire support members 13a to 13d as evident from FIG. 2(A).

FIG. 2(B) is a schematic cross-sectional view taken along arrows B-B in FIG. 1 as viewed from the leading end side. The wire support members are not formed in the cross section shown in FIG. 2(B) for the following reason. The wires 20a to 20f are not given a support from the outer side surface of the actuator arms, thus floating in the air.

In the head suspension assembly, the wire is connected to the head, the head is mounted on the slider, the slider is mounted on the flexure formed of a sheet material, the flexure is laminated on a surface of the load beam, and the load beam is laminated on a surface of the actuator arm. Since the wire is supported by the flexure or the load beam in the head suspension assembly, the wire is disposed in the vertical direction at a position farther away from the central surface in the vertical direction with respect to a plane including the front surface of the actuator arm.

In the B—B section, therefore, the position of the wire is away from the central surface to reach a point near the front surface of the actuator arm. This makes it impossible or difficult to form the wire support member provided with a slit or slits. Being flexible, the wire can be inserted and secured in the slit formed in the wire support member at the location of the A—A section. The wire cannot, however, be secured in the slit at the location near the B—B section which is close to the head suspension assembly. The wire is, in this case, in an aerial position.

As a result, air flowing from a direction of the inner side surface of the actuator arm along the front surface thereof forms a swirl immediately after the air has moved past the outer side surface of the actuator arm as shown in FIG. 3. This swirl gives the wire 20a oscillations in the vertical direction as shown by arrows X, that is, what is called a fluttering phenomenon. Since the wire 20a extends toward the leading end side of the head suspension assembly, and is secured to the load beam and the flexure and further to the slider, the oscillations are given to these components and consequently to the slider.

The wire support member 13a of the FIG. 2(A) has two vertical front surfaces 15, 17 (hereinafter referred to as "outer front surfaces"). The distance between the outer front surface 15 and the outer front surface 17 is referred to as a thickness of the wire support member. Referring to FIG. 2 (A), the thickness of the wire support member 13a is substantially equal to a thickness of the actuator arm 12a. A method could be conceivable in which at the location of the B—B section the thickness of the wire support member is increased to secure the wire in position and the slit is formed up to a point near the head suspension assembly. It is however necessary that the actuator arm be turned with a slight gap kept from the surface of the disk. This puts limitations on the thickness of the wire support member. Furthermore, if there is provided an excessively large step in a boundary between the wire support member and the actuator arm, the air flow is disturbed at a portion of the step, thus increasing the occurrence of fluttering in the actuator arm.

Another method could be conceivable in which the wire is bonded onto the front surface of the actuator arm, whereby the wire is secured up to a point near the head suspension assembly. This method, however, makes it difficult to remove and replace the head suspension assembly, should a fault be found as a result of an operation test carried out after the head suspension assembly has been mounted to the actuator assembly.

Still another conceivable method is to form a support structure such as a bracket integral with the actuator arm by molding on the outer side surface of the actuator arm. Since the actuator arm is disposed so that the inner side surface thereof is extremely close to the disk, it is difficult to widen both the inner side surface and the outer side surface in the lateral direction. Forming a bracket extending in the lateral direction only on the outer side surface for supporting the wiring destroys symmetry of the actuator assembly, which is not favorable in terms of operating characteristics.

Further, the wire support member may be extended further toward the leading end side, while keeping the same shape as that shown in FIG. 2(A) in an attempt to shorten the length of the portion of the wire not supported and running aerially. In this case, it is necessary that the wire be displaced abruptly so as to leave the central surface for a portion of the wire from where it comes out of the slit in the wire support member to where it is secured to the head suspension assembly. This not only makes it difficult to insert the wire in the slit, but also increases a possibility of the wire being damaged due to a rise in contact pressure between the wire and an entrance of the slit. In addition, an abrupt displacement could degrade functions of the wire.

It was therefore desired that a new wire support member be invented using the basic construction of the wire support member shown in FIG. 1 and preventing fluttering from occurring in the wire at portions where no slits can be formed.

BRIEF SUMMARY OF THE INVENTION

It is therefore a feature of the present invention to provide a rotary disk storage device supporting a wiring structure connected to a head on a side surface of an actuator arm so as not to allow fluttering to occur. It is another feature of the present invention to provide a wire support member used in such a rotary disk storage device.

The present invention thus provides a rotary disk storage device provided with a wire support member capable of supporting a wire in such a manner that fluttering does not occur as affected by an air flow generated on a surface of a rotating disk-shaped recording medium. According to an aspect of the present invention, a wire support member connected to a side surface of an actuator arm is provided with a fixing area for securing a wiring structure to the side surface of the actuator arm and an open area provided with opposing surfaces that oppose the wiring structure and protrude in the lateral direction of the actuator arm and adjoining the fixing area on the leading end side.

The inner side surface or outer side surface of the actuator arm may be used as a path for guiding the wiring structure connected to the head to a circuit board. The wire support member according to the present invention does not develop fluttering, since the wire support member secures the wiring structure to the actuator arm in the fixing area. Further, the open area helps alleviate fluttering on the leading end side on which the fixing area cannot be formed.

At a location a predetermined distance apart toward the supporting end side from a connection portion between the head suspension assembly and the actuator arm, the fixing area is provided to secure the wiring structure up against the side surface of the actuator arm, which prevents the effects of the air flow.

The open area has an effect of providing a support in such a manner that the wiring structure does not develop fluttering in an ordinary method of connecting the actuator arm with the head suspension assembly. In other words, generally speaking, the actuator arm and the head suspension assembly are manufactured as members different from each other and the head suspension assembly is overlapped and swage-connected to the surface of the actuator arm. Alternatively, the head suspension assembly may be connected to the actuator arm at a position a predetermined distance apart from the surface of the actuator arm by way of a member of some sort interposed therebetween in the vertical direction.

In such connection methods as described in the foregoing, the wiring structure supported by the head suspension assembly is positioned in the vertical direction at a point on an outside of the front surface of the actuator arm, namely, a level ever farther away from the front surface in relation to the central surface. It is therefore impossible to form the fixing area near the head suspension assembly to support the wiring structure. Since the open area is provided with opposing surfaces protruding in the lateral direction and opposing the wiring structure, the opposing surfaces function to suppress generation or effect of a swirl, allowing support to be provided without causing the wiring structure to develop fluttering. The opposing surfaces may or may not be in contact with the wiring structure.

The wiring structure includes at least a conductor serving as a signal path for the head and may be composed of the conductor and a material having a function of insulation, stiffness, protection, or the like as may be necessary. The wiring structure may have a cross-section shaped like a sheet, a circle, an ellipse, or any other similar arbitrary form, as may be selected appropriately.

Fixing the wiring structure in the fixing area implies to hold the entire wiring structure in position so as to prevent the wiring structure from deviating a position thereof with respect to the actuator arm or to retain a local position of the wiring structure. The wiring structure may be bonded to the wire support member using an adhesive, or any other known methods of fixing including fitting may be employed.

According to another aspect of the present invention, the outer front surface of the wire support member exists on substantially the same plane as the front surface of the adjacent actuator arm. The concept of the present invention includes an arrangement in which the thickness of the wire support member exceeds the thickness of the actuator arm. Having substantially the same thickness for both, however, will allow air passing along the front surface of the actuator arm to flow, as a laminar flow, up to the side surface of the wire support member. "Existing on substantially the same plane" means that a difference equivalent substantially to the manufacturing tolerance of the wire support material is allowed between the thickness of the wire support member and the thickness of the actuator arm.

According to still another aspect of the present invention, an end portion on the leading end side of the open area terminates at a position adjacent to an end portion on the supporting end side of the head suspension assembly. The open area according to a specific embodiment of the present invention is constructed as the opposing surfaces protruding in the lateral direction of the actuator arm. This construction allows the open area to be formed up to the position adjacent to the end portion on the supporting end side of the head suspension assembly. Because of being provided with the fixing area and the open area as described in the foregoing, the wire support member can support the wiring structure so as not to allow fluttering to occur on the side surface of the actuator arm.

According to yet another aspect of the present invention, the fixing area is composed of a first protruding wall and a second protruding wall and the wiring structure is housed in a space defined between the respective opposing surfaces of the protruding walls. Since the wiring structure is fixedly sandwiched between the opposing surfaces according to this construction, it is easy to remove and reinstall the wiring structure. Even when a nonconforming article is encountered as a result of a test conducted after the actuator head suspension assembly has been assembled, therefore, the head suspension assembly can be easily replaced with a conforming one.

The fixing area need only be provided with a function of securing the wiring structure in position. Therefore, it is not necessary to form the protruding walls as a continuous body in the longitudinal direction. The protruding walls may be divided into parts in the longitudinal direction. If the protruding walls are formed in several divisions, the strength of dies can be reinforced even with a narrow space provided between the opposing surfaces when the wire support member is manufactured by die-casting. Further, the boundary between the fixing area and the open area is given by an end portion of the second protruding wall, with the second protruding wall disappearing in the open area. A third protruding wall may be an extension of the first protruding wall toward the leading end side, or formed separately from the first protruding wall in the longitudinal direction.

The opposing surfaces of the fixing area have a surface running in parallel, and a surface angled, with respect to the front surface of the actuator arm. In addition, the opposing surfaces of the open area may also have a slant surface. The wiring structure displaces in a direction of being away in the vertical direction from the central surface from the fixing area toward the position of the head suspension assembly. It is not preferable that the wiring structure be displaced abruptly. Providing a slant opposing surface, however, allows the fixing area to be formed as close as possible to the leading end side without making the wiring structure displace abruptly.

If the opposing surface of the open area is also slantly formed in conformity with the displacement of the wiring structure, effects of a swirl can be effectively prevented by narrowing the gap between the wiring structure and the opposing surface. The opposing surfaces of the third protruding walls may be composed of two or more flat surfaces having slant angles different from each other and a gap is provided between the opposing surface and the wiring structure. This enhances workability when the head suspension assembly is mounted to the actuator arm.

According to still another aspect of the present invention, the wire support member is constructed so as to include a slit extending in the longitudinal direction to sandwich the wiring structure and a wall adjacent to an end portion of the slit in the longitudinal direction and providing the wiring structure with an opposing surface at the leading end side. The slit is convenient for securing the wiring structure without using any adhesive in order to allow the wiring structure to be removable. In addition to providing the slit with an open surface in the lateral direction, it is possible to provide the slit with an open surface in the vertical direction. Further, it is not necessary to limit the cross-sectional shape of the wire support member to a rectangle. It is therefore possible to provide an open surface in an oblique direction, instead of one in the vertical or lateral direction.

BRIEF DESCRIPTION OF THE DRAWINGS

FIGS. 7(A), 7(B), and 7(C) are side elevational views showing an actuator arm and a wire support member according to the embodiment.

FIG. 8 is a plan view showing part of an actuator arm and a wire support member according to the embodiment.

FIGS. 9(A), 9(B), 9(C), 9(D), and 9(E) are views showing different cross-sections of the wire support member shown in FIG. 7(C).

DETAILED DESCRIPTION OF THE INVENTION

Figure 1:
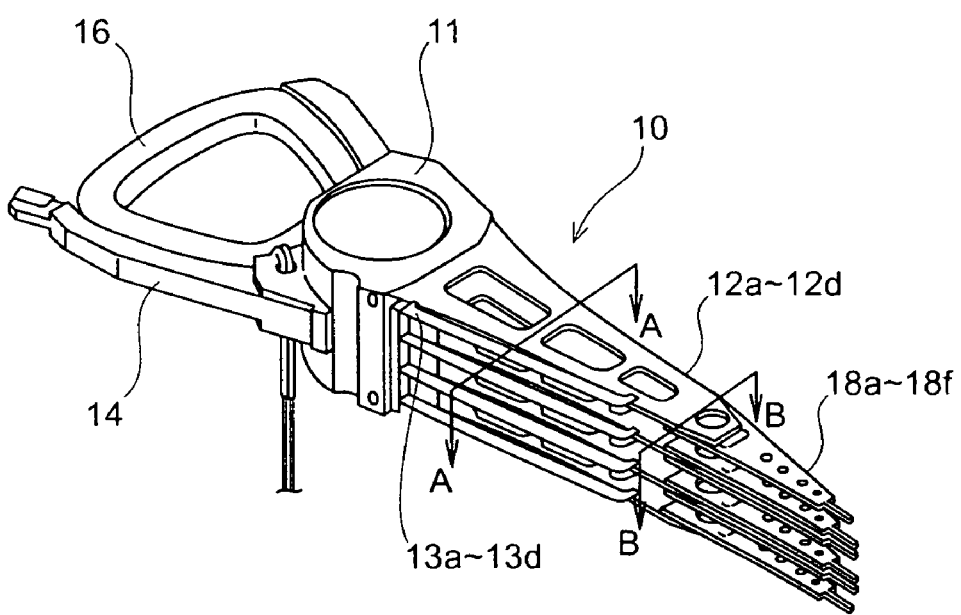
FIG. 1 is a view showing a conventional method for supporting wiring by an actuator arm.
Figure 2A:
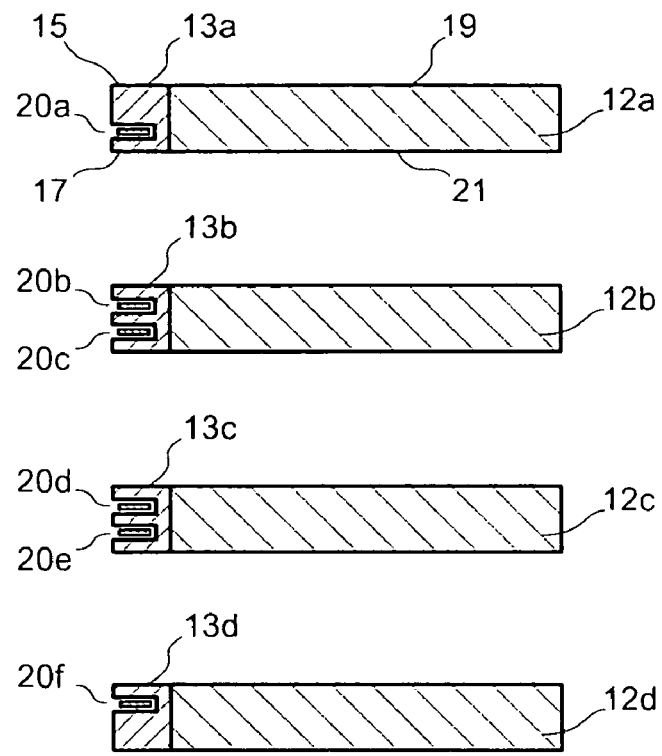
FIGS. 2(A) and 2(B) are cross-sectional views taken along arrows A—A and arrows B—B, respectively, in FIG. 1.
Figure 2B:
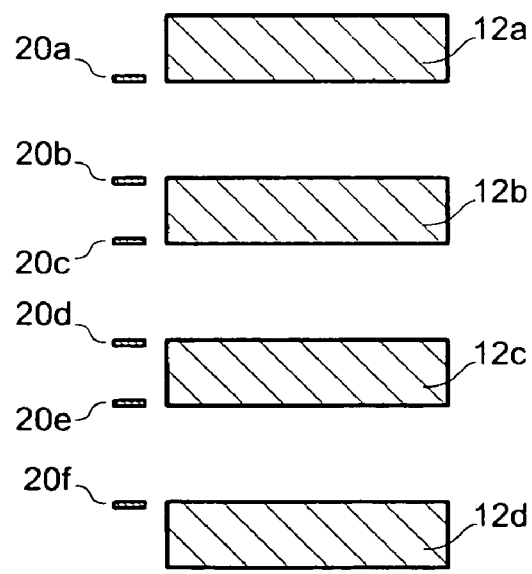
Figure 3:
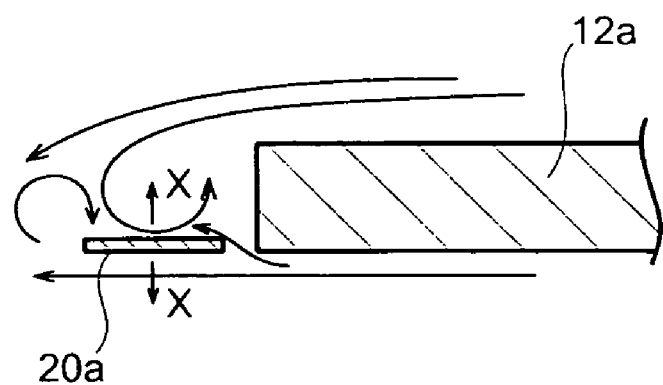
FIG. 3 is a view showing a state in which an air flow gives a wire oscillations on an outer side surface of an actuator arm.
Figure 4:
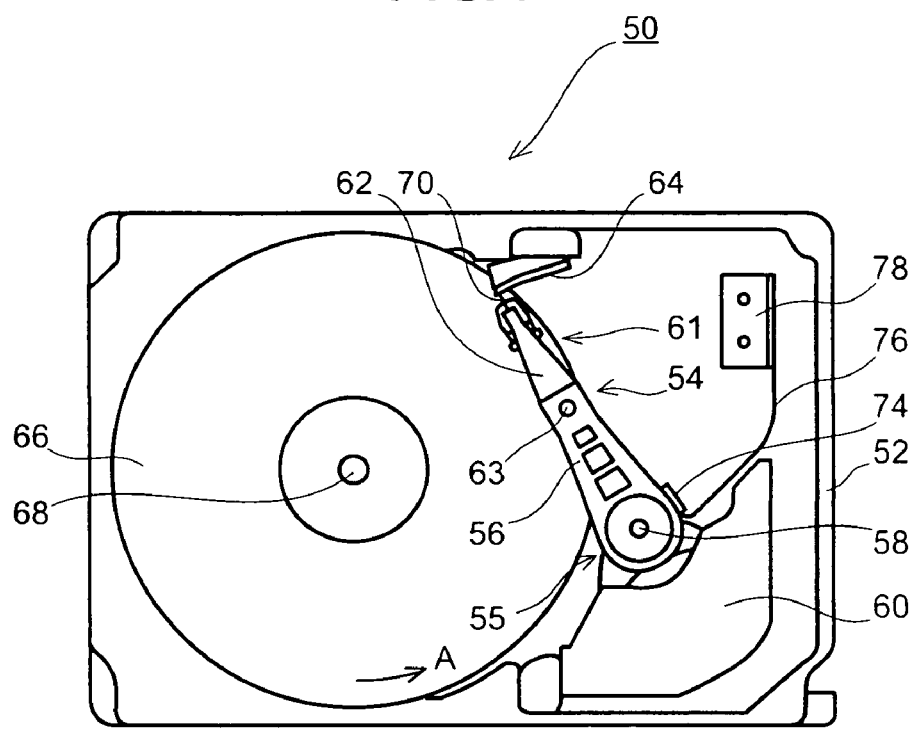
FIG. 4 is a plan view showing a schematic construction of a rotary disk storage device according to a preferred embodiment of the present invention.
Figure 5:
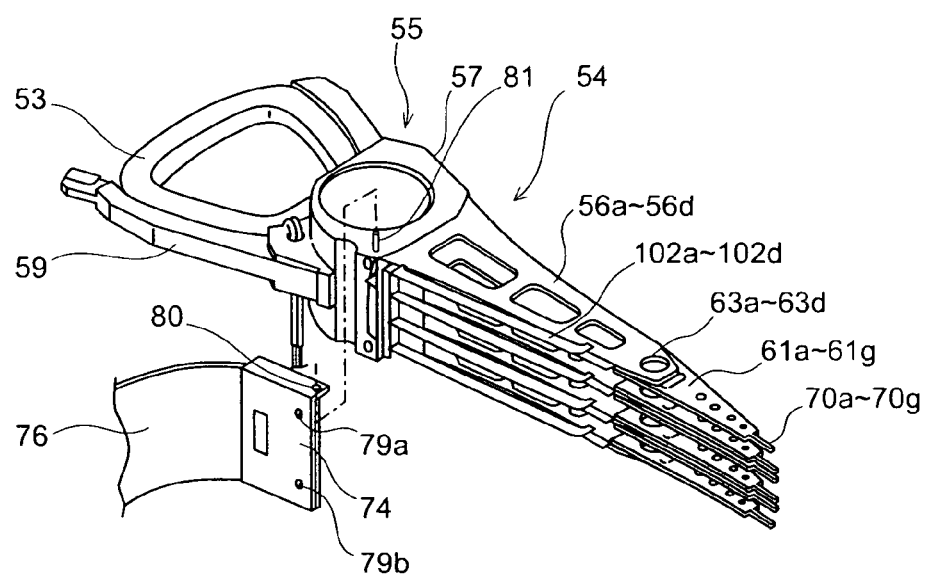
FIG. 5 is a perspective view showing an actuator head suspension assembly according to the embodiment.

Preferred embodiments of the present invention will be described with reference to the accompanying drawings. Throughout the entire figures, like reference numerals are used to denote like parts. FIG. 4 is a plan view showing a schematic construction of a magnetic disk device 50 applied to the embodiments of the present invention. FIG. 5 is a perspective view showing an actuator head suspension assembly 54 shown in FIG. 4. A housing 52 forms an enclosed space for a clean air with housing lids (not shown) joined to a bottom surface, side surfaces, and an upper surface thereof. There are accommodated inside the housing 52 an actuator head suspension assembly 54, a magnetic disk stack 66, a ramp 64, and the like.

The magnetic disk stack 66 composed of a single disk or two or more disks laminated one on top of another is mounted on a spindle hub (not shown) so as to rotate around a spindle shaft 68 supported by the bottom surface of the housing 52. A recording surface is formed on a front side and a backside of each of the disks. In the embodiment of the present invention, three magnetic disks laminated one on top of another are provided.

The actuator head suspension assembly 54 includes an actuator assembly 55 and a head suspension assembly 61. FIG. 5 shows the actuator assembly 55 composed of a pivot bearing 57, a coil support 59 holding a voice coil 53, and actuator arms 56a to 56d. The actuator assembly 55 may be formed by drawing aluminum and then forming it into a desired shape, or integrally formed through aluminum die-casting. A voice coil yoke 60 making up a voice coil motor with the voice coil 53 is disposed rearward of the pivot bearing 57. A permanent magnet is mounted on an inside of the voice coil yoke 60 to form a static magnetic field.

The magnetic disk stack 66 is composed of three magnetic disks laminated one on top of another. Each of the front side and the backside of each of these disks is provided with a recording area, corresponding to which four actuator arms 56a to 56d are laminated one on top of another. The actuator arms 56a and 56d are mounted with head suspension assemblies 61a and 61g, respectively. Head suspension assemblies 61b and 61c are mounted to an actuator arm 56b. Head suspension assemblies 61d and 61e are mounted to an actuator arm 56c. A boss 95 of a mount plate 82 (see FIG. 6) is connected to each of swage holes 63a to 63d formed on the leading end side of the actuator arms by a swaging process, thereby establishing a connection of each of the actuator arms with each of the head suspension assemblies 61a to 61g.

All head suspension assemblies 61a to 61g share the same construction and are connected to the actuator arms 56a to 56d, respectively, by the same method as described in the foregoing. Any one of the head suspension assemblies 61a to 61g is composed of a head reading data from and writing data to the disk, or either reading data from or writing data to the disk, a slider mounted with the head, a flexure flexibly supporting the slider to permit a pivotal motion, and a load beam 62 supporting the flexure in such a manner that a pressure is applied to the slider to make the slider move toward the disk surface. The head suspension assembly may be configured to further include a wiring structure connected to the head.

Tabs 70a to 70g to be engaged with a ramp 64 are each formed on a leading edge of each of the load beams. The actuator head suspension assembly 54 allows the tabs 70a to 70g to engage with the ramp 64 for retracting the slider before bringing rotating disks to a stop.

A circuit board (not shown) for controlling an operation of the magnetic disk device 50 and data communications of the magnetic disk device 50 with the external is mounted on the outside of a bottom of the housing 52. The wiring structures (not shown) connected to the heads are wired along the head suspension assemblies 61a to 61g and the actuator arms 56a to 56d up to a bracket 74 in order to form paths for electric signals between the heads and the circuit board.

Wire support members 102a to 102d made of a light-weight material having a relatively large stiffness, such as plastics, are mounted on the outer side surfaces of the actuator arms 56a to 56d, respectively. The wire support members 102a to 102d are connected to each other at positions near the pivot bearing 57 for the sake of convenience of an operation of fixing the wire support members 102a to 102d to the actuator arms and manufacturing through die-casting. Each of the wire support members 102a to 102d may nonetheless be manufactured separately for each actuator arm.

A slit provided with a surface open in the lateral direction is formed in each of the wire support members 102a to 102d. This slit is for accommodating therein the wiring structure and securing the wiring structure to the actuator arm. One slit is formed in each of the wire support members 102a and 102d mounted, respectively, to the actuator arms 56a and 56d. Two slits running in parallel with each other are formed in each of the wire support members 102b and 102c mounted, respectively, to the actuator arms 56b and 56c.

In the embodiment, the number of the slits is allowed to correspond to the number of the head suspension assemblies attached to the actuator arm in question, that is, the number of the wiring structures connected to the head. Another approach is nonetheless possible, in which, for example, the wire support members 102a and 102d and the wire support members 102b and 102c are all manufactured to have the same shape with one slit in each of the wire support members 102b and 102c which remains unused. Still another approach is to form a single, wider slit in each of the wire support members 102b and 102c to accommodate two wiring structures in this wider single slit.

The wiring structure extending from the head suspension assembly is accommodated in the slit in the wire support member on the outer side surface of the actuator arm and wired up to the bracket 74. An interval between an outer periphery of the magnetic disk 66 and the inner side surface of the actuator arm is limited and therefore it is more convenient to provide the wire support member on the side of the outer side surface than on the side of the inner side surface of the actuator arm. The wiring structure is formed into a sheet and connected to a conductor of a flex cable 76 at the bracket 74. The flex cable 76 is routed up to a bracket base side 78, secured to the bottom surface of the housing 52, and then connected to the circuit board provided on the backside of the housing 52.

The bracket 74 is provided with a bonding pad on an insulation sheet of the flex cable 76 in order to establish a connection between the flex cable 76 and the wiring structure connected to the head. Part of the flex cable 76 is bent at an upper portion of the bracket 74 and a solder hole 80 is formed therein. A ground pad connected to a ground wire, which is part of a wiring pattern of the flex cable 76, is formed around the solder hole 80.

When mounting the bracket 74, a solder pin 81 made of brass or the like is inserted in a pin hole formed in the pivot bearing 57. The bracket 74 is connected to a side surface of the pivot bearing 57 using threaded holes 79*a*, 79*b*. Further, the solder pin 81 is inserted through the solder hole 80. An electrical connection is established between the ground pad and the pivot bearing 57 when heat is applied to part of the solder pin 81 projecting onto the pattern of the flex cable 76.

Figure 12:
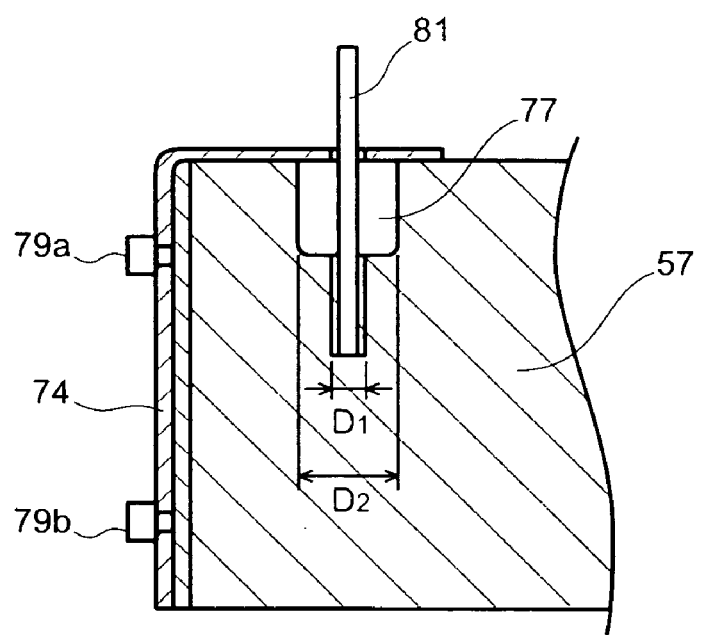
FIG. 12 is a view for explaining a soldering joint of a flex cable according to the embodiment.
Figure 13:
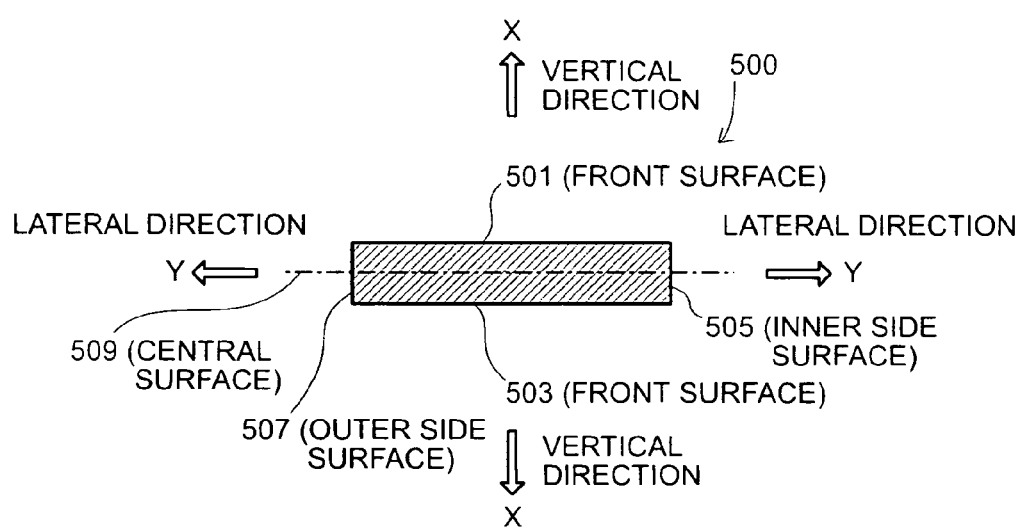
FIG. 13 is a view for explaining definitions of terminology used in this specification relating to an actuator arm.

If the flex cable 76 is thin, the following problem could result. Specifically, since the pivot bearing 57 made of aluminum or other metal has relatively good thermal conductivity, a solder heat applied to a leading edge of the solder pin 81 tends to escape through the pivot bearing 57, making it difficult to maintain good quality of a soldered joint. In the embodiment, a pin hole 77 formed in the pivot bearing 57 for inserting therein the solder pin 81 has some unique characteristics as shown in FIG. 12. Specifically, the pin hole 77 is composed of a portion having an inside diameter D1 corresponding substantially to an outside diameter of the solder pin 81 and a portion having an inside diameter D2 greater than the inside diameter D1. The portion formed with the inside diameter D2 is formed near a surface of the pivot bearing 57.

By adopting such a construction as that described above, the heat applied to the solder pin 81 does not easily escape through the pivot bearing 57, which ensures a soldered joint of good quality. The pin hole exemplified in the embodiment is an internally circular hole. One skilled in the art will, however, appreciate that the shape of the pin hole is not limited to only a circle, but rather, the hole may take any other arbitrary shape.

A pivot shaft 58 supported on the bottom surface of the housing 52 is inserted in the pivot bearing 57. The actuator assembly 55 can be turned about the pivot shaft 58 in the horizontal direction. When a controlled current is allowed to flow through the voice coil 53 disposed in the static magnetic field generated by the voice coil yoke and the magnet, a driving force is generated in the actuator assembly 55, turning the actuator arm and the head suspension assembly connected to the actuator arm in the horizontal direction. This brings the head at a predetermined track position.

When the magnetic disk 66 is rotated in a direction of arrow A shown in FIG. 4, an air flow is generated on a surface of the disk. This gives an air bearing surface of the slider an ascending force, thus causing the slider to float from the disk surface. To position the head at the predetermined track, a servo signal read by the head from the track of the disk 66 is used to control the current flowing through the voice coil. If the slider oscillates irregularly as affected by the air flow, the accuracy of servo control is degraded.

When making a turning motion for positioning the head at the predetermined track, the actuator head suspension assembly 54 can allow fluttering to occur because of the air flow colliding with different parts thereof as a result of an attempt to position the actuator arm and the head suspension assembly onto the disk surface.

Figure 6:
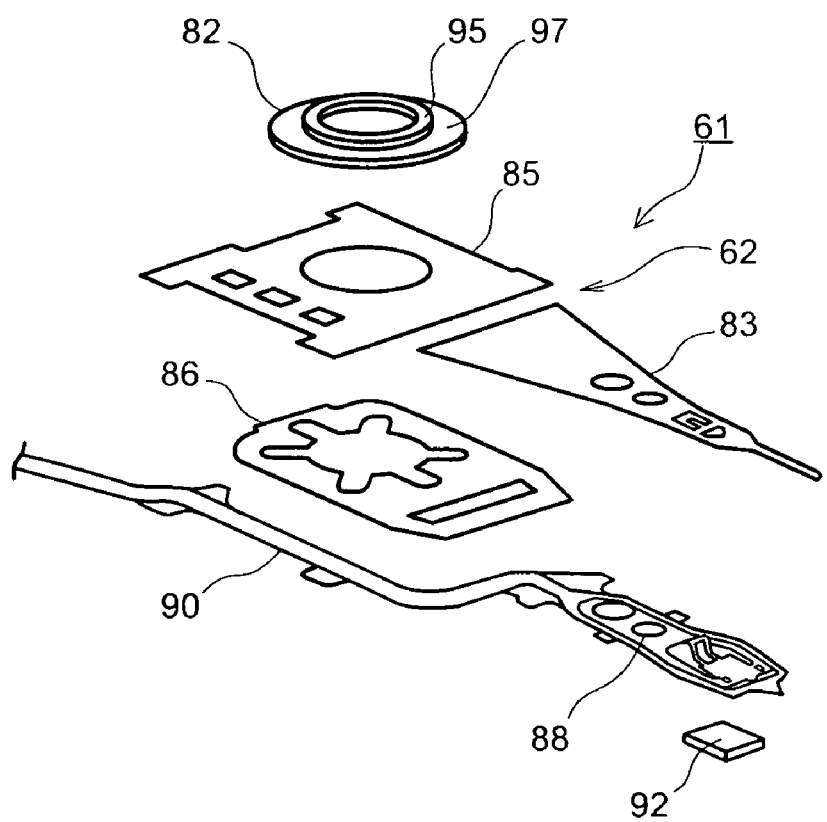
FIG. 6 is an exploded perspective view showing a head suspension assembly according to the embodiment.

FIG. 6 is a perspective view showing schematically a head suspension assembly 61. The head suspension assembly 61 is composed of the load beam 62 formed of a thin stainless steel sheet, a flexure 88, a slider 92, and the mount plate 82. The load beam 62 is called a multi-piece type composed of a beam portion 83, a base portion 85, and a hinge portion 86. The load beam of the present invention is not limited to one having such a configuration; a load beam of any other known configuration, such as a three-piece type, may be employed.

The hinge portion 86 has a spring function of giving a negative pressure opposing the ascending force the slider receives from the air flow generated through rotation of the disk. The beam portion 83 is provided with a stiffness function of supporting the flexure 88 in a stabilized position when the actuator head suspension assembly 54 makes a turning movement.

The base portion 85 is provided with strength for securing the load beam 62 to the actuator arm. The circular boss 95 is formed at a center of the mount plate 82. A flange portion 97 of the mount plate 82 is bonded to the base portion 85 by spot welding or with an adhesive. The flange portion 97 is overlapped with the surface of the actuator arm, the boss 95 is inserted into the swage hole 63 in the actuator arm, and thus the mount plate 82 is connected to the actuator arm by the swaging process.

The hinge portion 86 is joined to the beam portion 83 and the base portion 85 by spot welding or with an adhesive. The flexure 88 is manufactured by processing a laminated sheet comprising a stainless steel metal layer, a polyimide insulation layer, a copper conductive layer, and a polyimide protective layer, laminated in that order from the load beam side, by a known photolithographic etching process.

The metal layer performs functions of providing stiffness for controlling the behavior of the slider 92 and a support area for the slider 92, thereby defining stiffness of the flexure 88. The insulation layer provides a function of insulating the conductive layer electrically from the metal layer. The conductor layer provides part of the electrical signal path between the head mounted on the slider and the circuit board. The protective layer is provided for protection of surfaces of the conductive layer and may be replaced by another method, such as gold plating or the like. The metal layer, the insulation layer, the conductive layer, and the protective layer are thus formed into a laminated structure of a sheet form. The conductive layer is connected to the head and the metal layer is bonded or spot-welded to the load beam 62. The laminated structure thereby extends as a wiring structure 90 along the outer side surface of the actuator arm toward the supporting end side.

As described in the foregoing, the flexure 88 and the wiring structure 90 provide the laminated structure in which the metal layer, the insulation layer, and the conductive layer are laminated in this order from the side of the load beam 62. In addition, the head suspension assembly 61 is secured to the actuator arm by superposing the flange portion 97 of the mount plate 82 on the surface of the actuator arm. The position of the wiring structure in the head suspension assembly 61 in the vertical direction is therefore located farther away from the central surface of the actuator arm by the thickness of the mount plate 82 and the thickness of the load beam 62 with respect to the plane including the surface of the actuator arm.

FIG. 7, including FIGS. 7(A), 7(B), and 7(C), is a view illustrating the outer side surfaces of parts of the actuator arms 56*a*, 56*b* on the leading end side and side surfaces of the wire support members 102*a*, 102*b* shown in FIG. 5. FIG.

8 is a plan view showing the actuator arm 56a and the wire support member 102a on the leading end side.

FIG. 7(A) is a view showing the outer side surface of the actuator arm 56a with the wire support member 102a removed. FIG. 7(B) is a view showing the side surface of the wire support member 102a mounted on the outer side surface of the actuator arm 56a. FIG. 7(C) is a view showing the side surface of the wire support member 102b mounted on the outer side surface of the actuator arm 56b.

Referring to FIGS. 7(A), 7(B), and 7(C), an additional line L represents a center line of the swage holes 63a to 63d shown in FIG. 5. FIGS. 7(A), 7(B), and 7(C) are aligned with each other in the longitudinal direction with the center line L of the swage holes 63a to 63d used as a reference. As shown in FIG. 7(A), a thickness formed with a front surface 302 and a front surface 303 of the actuator arm 56a is greater than a thickness formed with a front surface 304 and a front surface 305 of the actuator arm 56a. The front surfaces 302 and 303 are located on the supporting end side, while the front surfaces 304 and 305 are located on the leading end side.

The thickness on the supporting end side defined by the front surfaces 302 and 303 of the actuator arm 56a is set to about 1 mm to 1.3 mm. The thickness on the leading end side defined by the front surfaces 304 and 305 of the actuator arm 56a is set to about 0.72 mm to 0.74 mm. The actuator arm 56a varies in thickness in the longitudinal direction. This is done for the following reasons. A predetermined thickness is necessary on the supporting end side, since the actuator arm is required to be provided with stiffness for stably supporting the head suspension assembly during operation. On the other hand, in order to maintain the satisfactory floating characteristic of the slider, it is necessary to make the actuator arm thinner on the leading end side or the total weight of the same lighter because the gap between the head suspension assembly and the disk surface cannot be enlarged so much.

Referring to FIG. 7(B), the wire support member 102a is attached to the outer side surface of the actuator arm 56a using an adhesive. The wire support member is provided with a base wall (not shown) disposed along the outer side surface of the actuator arm in the longitudinal direction. A backside of the base wall is bonded to the outer side surface of the actuator arm. The wire support member 102a is formed in such a manner that the protruding walls 108a, 110a protrude in the lateral direction from a surface of the base wall. The protruding walls 108a and 110a are provided with outer front surfaces 322 and 324, respectively, in the vertical direction.

The front surface 302 and the front surface 303 of the actuator arm 56a exist on substantially the same plane as the outer front surface 322 and the outer front surface 324 of the wire support member 102a, respectively. It is preferable in terms of prevention of fluttering that the wire support member be formed to be substantially as thick as, or thinner than, the actuator arm; this fluttering would otherwise occur due to collision of the air flowing along the surface of the actuator arm against the backside of the wire support member. The present embodiment can, however, give a sufficiently good effect in preventing fluttering thanks to a highly unique structure called an open area to be described later, even if the wire support member is thicker than the actuator arm. An effect on fluttering given by respective differences produced between the outer front surface 322 and the front surface 302, and between the outer front surface 324 and the front surface 303 are so minimal as to be negligible as compared with an effect given by the wiring structure being aerially disposed. The protruding wall 110a is not formed continuously in the longitudinal direction. There is no protruding wall provided in a position indicated by reference numeral 323, at which the surface of the base wall is visible.

Not forming the protruding wall locally helps strengthen a structure of dies. Specifically, the dies are to be provided with a shape in reverse of the wire support member. Because of a narrow gap available in a slit 104a to be described later, a portion of the dies made of metal corresponding to the slit is formed into a thin sheet and therefore plastics can be damaged when withdrawn after the plastics has been hardened. The thin-wall portion of the dies can be reinforced with a portion of the dies corresponding to the portion indicated by reference numeral 323.

A wiring structure 90a is molded into a sheet form. The protruding walls 108a, 110a protrude in the lateral direction from the base wall and are provided with opposing surfaces maintaining a predetermined gap from each other so as to form the slit 104a for inserting and securing therein the wiring structure 90a. The slit 104a is defined by an opposing surface of the protruding surface 108a facing one surface of the wiring structure 90a, an inner surface provided by the base wall, and a surface of the protruding surface 110a facing the other surface of the wiring structure 90a.

In FIG. 7(B), ranges denoted by symbols (a) through (d) are defined to describe the longitudinal characteristics of the wire support member. The slit 104a is formed substantially in parallel with the front surfaces 322, 324 of the actuator arm 56a over the range (a). Over the range (b), the slit 104a is formed so as to tilt from the central surface of the actuator arm toward the front surface thereof, while ensuring that the opposing surfaces of the protruding walls 108a, 110a with respect to the wiring structure maintain a predetermined interval from each other.

The wiring structure 90a is therefore secured to the slit 104a formed between two planes including the two front surfaces of the actuator arm, respectively, over the range (a) and the range (b). Over the range (b), the slit 104a tilts toward the outer front surface 324. At a boundary between the range b and the range c, therefore, the protruding wall 110a can no longer maintain a wall thickness and an end portion P is formed in the longitudinal direction. Then, in the range (c), the protruding wall 10a disappears. The longitudinal end portion P of the protruding wall 110a is formed into a curved surface in the longitudinal and lateral directions in order to facilitate an operation of inserting the wiring structure in the slit 104a and prevent the wiring structure from being damaged.

The end portion P of the protruding wall 110a is significant, regardless of a shape thereof, in that the end portion P provides a position as a boundary, at which the wiring structure is freed from fixation by the slit. The ranges (a) and (b) provide an area for securing the wiring structure by means of the wire support member and are thus called a fixing area. The range (c), on the other hand, serves as an area, over which the wiring structure is not restrained by the wire support member and is referred to as an open area. Part of the wiring structure falls in the open area as long as the wiring structure can be moved in a direction opposite to the position of an opposing surface even if the part of the wiring structure is in contact with the opposing surface. The definitions of the fixing area and the open area are applicable to the wire support member 102b shown in FIG. 7(C) and other wire support members.

In the open area, only the protruding wall 108a protrudes from the base wall. An outer front surface 326 of the protruding wall 108a is substantially on the same plane as the front surface 304 of the actuator arm. An opposing surface 328 of the protruding wall 108a opposing the wiring structure 90a tilts gently toward the front surface so as to be away from the central surface of the actuator arm as the opposing surface 328 approaches the leading end side. The inclination becomes sharper on an opposing surface 330 and an opposing surface 332 runs substantially in parallel with the front surface of the actuator arm.

In the embodiment, the protruding wall 108a of the open area is formed continuously from the protruding wall 108a of the fixing area. The protruding wall of the open area may nonetheless be separated from the protruding wall of the fixing area at either a boundary between the fixing area and the open area or within the open area. The wiring structure coming out from the end portion P of the protruding wall 110a extends up to the boundary between the range (c) and the range (d), being inclined gently along the opposing surfaces 328, 330, and 332. In FIG. 7(B), there is provided a relatively wide gap between the opposing surface 328 and the wiring structure 90a.

This gap is significant in that the gap enhances workability in inserting the wiring structure 90a into the slit 104a in the wire support member. The metal layer of the wiring structure is made of the same material as that of the flexure by the same process. The wiring structure is formed as part of the head suspension assembly 61a. The wire support member is secured to the actuator arm by bonding. The head suspension assemblies 61a to 61g are secured onto the respective swage holes 63a to 63d of the actuator arms 56a to 56d and the wiring structure is inserted and secured in the slit as detailed in the following.

First, the head suspension assemblies 61a to 61g and the wiring structures are laminated and held in position in alignment with the actuator arms 56a to 56d using ajig. Then, the head suspension assemblies 61a to 61g and the wiring structures are inserted from the lateral direction so that each of the head suspension assemblies is located at a position corresponding to the front surface of the corresponding actuator arm on the leading end side. Since the wiring structures are provided with the metal layers having stiffness, the wiring structures cannot be inserted as they are in the slits formed slantly on the central surface side, i.e., inward with respect to the front surfaces of the actuator arms at this time.

To circumvent this difficulty, the following steps are taken. Specifically, one comb of a comb-like guide is disposed at a position of the opposing surface 328 and a position of the opposing surface 356 between the wiring structures 90a and 90b shown in FIGS. 7(B) and 7(C) respectively. The wiring structure is slightly bent, while being pressed in the central surface direction along the guide, and aligned at the position of the end portion P so as to be fitted into the slit. It is convenient at this time if a space is available for allowing the wiring structure to bend in order to insert the wiring structure into the slit using the guide.

The opposing surface 332 is also provided with a slight gap from the wiring structure 90a. The opposing surface 332 and the wiring structure 90a may be manufactured in such a manner as to be in tight contact with each other. The protruding wall 108a in the open area does not secure the wiring structure in position throughout an entire area of the range (c) and there is provided a gap from the wiring structure. The protruding wall 108a nonetheless has an effect of preventing the air flowing along the surface of the actuator arm from generating a swirl affecting the wiring structure or alleviating the effect of the swirl on the wiring structure. That is, the protruding wall 108a is effective in preventing the wiring structure from developing fluttering.

In addition, an open area structure does not limit a degree of freedom in installing or removing the wiring structure to or from the wire support member. Nor does the open area structure produce any adverse effect resulting in a new cause of oscillations due to the air flow.

The open area defined by the range (c) begins with the end portion P of the protruding wall 110a and ends with a position adjacent to an end portion which a base portion 85a of the load beam forming part of the head suspension assembly has on the supporting end side. By "adjacent to," it is meant that a gap equivalent substantially to manufacturing tolerances is allowed between the end portion and the base portion. In addition, the spirit of the present invention still includes an arrangement, in which the open area is terminated at a position with a gap of about 2 mm from the end portion.

The range (d) is a fluttering-free area, since the head suspension assembly secures the wiring structure in position. The flange portion 97a of the mount plate overlaps the front surface 305 of the actuator arm 56a at a position of the swage hole 63. In addition, the base portion 85a of the load beam is placed on the flange portion 97a. The boss 95 of the mount plate is inserted in the swage hole 63.

The metal layer of the wiring structure 90a is secured onto the surface of the base portion 85a by spot welding or bonding as appropriately and extends to the head. The thickness of the flange portion 97a of the mount plate is set to about 150 μm, the thickness of the base portion 85a of the load beam is set to about 100 μm, the thickness of the metal layer of the flexure is set to about 20 μm, and the thickness of the wiring structure comprising the insulation layer, the conductive layer, and the protective layer is set to about 28 to 54 μm. This means that the interval from the front surface of the actuator arm to a surface closest to the central surface of the wiring structure (a boundary surface between the metal layer of the flexure and the base portion 85a of the load beam) is about 250 μm.

The interval from the center line L of the swage hole to the boundary between the open area and the fixing area measures nearly 7 mm. The interval from the center line L to the boundary between the range a and the range b measures nearly 8.8 mm. In the open area, both ends of the wiring structure 90a are secured by the end portion P of the protruding portion 110a and the base portion 85a. Over this area, the wiring structure 90a retains the shape thereof by means of stiffness thereof.

Before an explanation about FIG. 7(C) is given, FIG. 8 will be described. FIG. 8 is a plan view showing the wire support member 102a and the actuator arm 56a. The front surface 302 of the actuator arm adjoins the outer front surface 322 of the wire support member 102a and the front surface 304 of the actuator arm adjoins the outer front surface 326 of the wire support member 102a. A claw 103 for locking the wire support member onto the actuator arm extends from the wire support member to the front surface 304. The end portion P is formed at the position of the claw 103 in the longitudinal direction, forming the boundary between the fixing area and the open area.

The wire support member 102b will be explained with reference to FIG. 7(C) and FIGS. 9(A) through 9(E). The wire support member 102b is mounted on the outer side surface of the actuator arm 56b supporting the two head suspension assemblies 61b, 61c. Two wiring structures are therefore wired on the outer side surface of the actuator arm 56b and slits 104b, 104c for accommodating therein the two wiring structures 90b, 90c are formed in the fixing area defined by the ranges (a) and (b). Further, opposing surfaces 356, 360 opposing the wiring structure 90b and opposing surfaces 358, 362 opposing the wiring structures 90c are formed symmetrically with respect to the central surface on both surfaces of the protruding wall 108b in the open area defined by the range (c).

FIGS. 9(A) to 9(E) are cross-sectional views taken along arrows A—A, arrows B—B, arrows C—C, arrows D—D, and arrows E—E, respectively, showing the actuator arm 56b and the wire support member 102b as viewed from the leading end side. FIG. 9(A) shows that a back surface of a base wall 105b forming part of the wire support member 102b is bonded to the outer side surface of the actuator arm 56b. In addition, the outer front surface 352 exists on substantially the same plane as the front surface 308 of the adjoining actuator arm 56b, while the outer front surface 354 exists on substantially the same plane as the front surfaces 310 of the adjoining actuator arm 56b.

Protruding walls 106b, 108b, 110b protrude in the lateral direction from an inner surface of the base wall 105b. The protruding wall 106b and the protruding wall 108b are provided with the respective faces opposite to each other to form the slit 104b in the lateral direction for separating the protruding wall 106b from the protruding wall 108b. The wiring structure 90b is accommodated in the slit 104b. The protruding wall 108b and the protruding wall 110b are provided with the respective faces opposite to each other to form the slit 104c in the lateral direction for separating the protruding wall 108b from the protruding wall 110b. The wiring structure 90c is accommodated in the slit 104c.

A section A—A is where the slit is formed in parallel with the front surface of the actuator arm. The slit 104b and the slit 104c are disposed at their respective positions relatively closer to the central surface. A sufficient wall thickness is therefore allowed for the protruding walls 106b, 110b. As explained about reference numeral 323 in FIG. 7(B), no protruding walls are provided in respective portions indicated by reference numerals 325, 355 in FIG. 7(C), thereby enhancing the strength of the dies.

A section B—B shown in FIG. 9(B) is within the fixing area, but the slits 104b, 104c are respectively inclined toward the outer front surfaces 352, 354 in the longitudinal direction. Hence, the interval between the slit 104b and the slit 104c is greater than that in FIG. 9(A). A section C—C shown in FIG. 9(C) is within the open area; however, the protruding walls 106b, 110b are not drawn since the protruding walls 106b, 110b disappear at the end portion present at the boundary between the range (b) and the range (c).

The two opposing surfaces 356, 358 of the protruding wall 108b are inclined further from the positions shown in FIG. 9(B) toward the front surfaces in the longitudinal direction. This results in an increase of the thickness of the protruding wall 108b in the vertical direction. The opposing surface 356 provided for the protruding wall 108b is on substantially the same plane as the front surface 312 of the actuator arm at this cross section. Likewise, the opposing surface 358 provided for the protruding wall 108b is on substantially the same plane as the front surface 314 of the actuator arm at this cross section. The wiring structures 90b, 90c are held with only a slight gap provided from the opposing surfaces 356, 358, respectively. The wiring structures do not oscillate as affected by the swirl generated from the air flow in the fixing area. The wiring structures 90b, 90c receive only a minimal effect from the swirl in the open area shown in FIG. 9(C), since the swirl occurs in the lateral direction of the protruding wall 108b.

At a section D—D shown in FIG. 9(D), the two opposing surfaces 360, 362 exist at their respective locations farthest away from the central surface in the vertical direction. As in FIG. 9(C), the wiring structures 90b, 90c are held in position with only a slight gap from the opposing surfaces 360, 362, respectively. The two opposing surfaces 360, 362 are higher than the front surfaces 312, 314, respectively, of the actuator arm, thus producing the respective differences between the front surfaces of the actuator arm and the opposing surfaces. Since the opposing surfaces 360, 362 are short in the longitudinal direction, however, there is only a little chance in which air flows collide with the differences to give the actuator arm oscillations.

A section E—E shown in FIG. 9(E) shows a state in which the wiring structure is supported by a base portion 85b of the load beam. Flange portions 97b, 97c of the mount plate are fixedly placed on the front surfaces 312, 314, respectively, of the actuator arm 56b. Further, base portions 85b, 85c of the load beam are placed on and spot-welded to the flange portions 97b, 97c, respectively. Metal layers 93b, 93c forming part of the wiring structure are placed on and spot-welded to the front surfaces of the base portions, respectively.

Each of the wiring structures 90b and 90c comprises the insulation layer, the conductive layer, and the protective layer laminated one on top of another and on the metal layer. The wiring structure is therefore thicker than the metal layer. The metal layer gives the wiring structure stiffness. As shown in FIG. 7(C), the protruding walls 106b, 108b terminate at an end portion Q and an end portion R, respectively, on the leading end side. The wiring structures 90b, 90c therefore maintain the shapes thereof by stiffness of their own until the base portions 85b, 85c of the load beam respectively provide support for the wiring structures 90b, 90c.

The embodiments of the present invention have been described for two examples; one having one slit and the other having two slits. In either case, the slit is provided with a fixing area and an open area located adjacent to the fixing area on the leading end side. It is preferable that the length of the fixing area account for about 60% to 90% of the entire length of the wire support member.

A measurement was taken of fluttering as variation in lateral displacement of the slider when the magnetic disk of a rotary disk storage device using the wire support member shown in FIG. 7 was rotated at a speed of 7200 rpm. The measurement was taken in two cases, one in which the open area was provided and the other in which the open area was not provided. The displacement was measured by making the slider irradiated with a laser beam emitted from a side surface of the housing. It was found that fluttering could be reduced to ⅔ in a relatively high frequency range near 6 kHz. The fact that fluttering in the high frequency range could be dampened indicates that the wire support member according to the present invention is effective in reducing fluttering occurring from a relatively short wiring structure in the open area.

Figure 10A:
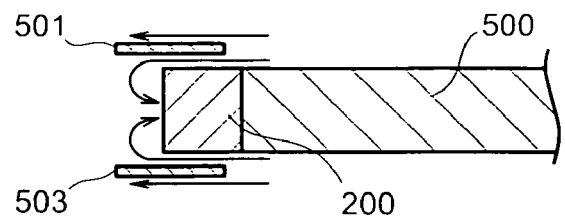
FIGS. 10(A) and 10(B) are views for explaining wire support members according to other embodiments of the present invention.

The wire support member has so far been described according to specific preferred embodiments of the present invention. Additional preferred embodiments falling within the spirit and scope of the present invention will be described with reference to FIGS. 10(A) and 10(B). FIG. 10(A) is a cross-sectional view showing an actuator arm 500 and a wire support member provided with a protruding wall 200 connected to the actuator arm 500, taken at a specific location in an open area. A length L1 of the protruding wall in the lateral direction forming opposing surfaces opposite to wiring structures 501, 503, respectively, is shorter than a width L2 of the wiring structures. It is preferable that the protruding length of the protruding wall be equal to or longer than that of the wiring structure. A protruding wall having the protruding length shorter than the length of the wiring structure is nonetheless still effective, since the effect of the swirl produced at the entire surface of the protruding wall on the wiring structure is smaller than the case when no protruding wall exists at all.

Figure 10B:
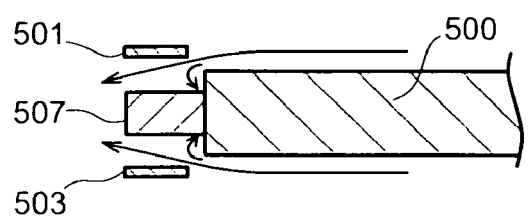

FIG. 10(B) shows an embodiment, in which a protruding wall 507 is thinner than in the case of FIG. 10(A), providing the respective greater gaps between the wiring structures 501, 503 and corresponding opposing surfaces of the protruding wall 507. The air flow produces small swirls in front of the outer side surface of the actuator arm, giving oscillations to the wiring structure. The embodiment is still effective, since the effect of the swirl on oscillations can be minimized as compared with the conventional method having no protruding walls at all.

Figure 11A:
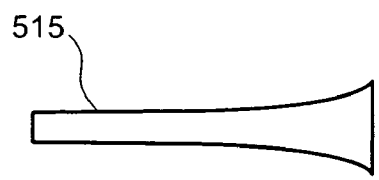
FIGS. 11(A), 11(B), 11(C), 11(D), and 11(E) are views for explaining wire support members according to other embodiments of the present invention.
Figure 11B:
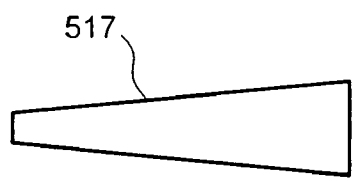
Figure 11C:

FIGS. 11(A) through 11(E) are views showing schematically the open areas of the wire support members as viewed from the lateral direction. The views shown in FIGS. 11(A) to 11(E) correspond to the protruding wall 108b in the open area shown in FIG. 7(C). In FIG. 11(A), a protruding wall is formed such that it is provided with opposing surfaces each having a curved continuous surface 515 facing the wiring structure. In FIG. 11(B), a protruding wall is formed such that it is provided with opposing surfaces each having an inclined flat surface 517 facing the wiring structure. In FIG. 11(C), a protruding wall is formed such that it is provided with opposing surfaces each having an uninclined or flat surface 519 facing the wiring structure.

Figure 11D:
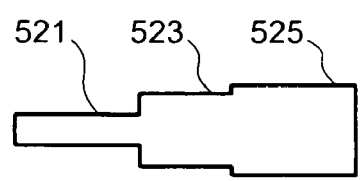
Figure 11E:
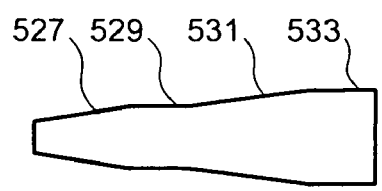

In FIG. 11(D), a protruding wall is formed such that it is provided with two or more steps 521, 523, 525. In FIG. 11(E), a protruding surface is formed such that it is provided with opposing surfaces each having flat surfaces 527, 529, 531, 533 with their respective inclinations different from one another. In this case, it is not necessary to form different protruding walls continuously in the longitudinal direction and the opposing surface may be provided only locally.

It will be understood that the foregoing description has been made on the specific embodiments of the present invention shown on the accompanying drawings and that the invention is not limited thereto, but may be otherwise variously embodied in any known arrangements as long as the effects of the present invention are produced.

According to specific embodiments of the present invention, it is possible to provide a wire support member for supporting a wiring structure so as not to allow fluttering to occur on a side surface of an actuator arm and a rotary disk storage device using the same.

What is claimed is:

1. A rotary disk storage device comprising:
   a head suspension assembly provided with a wiring structure connected to a head;
   an actuator assembly provided with an actuator arm connected on a leading end side to said head suspension assembly and turning said actuator arm; and
   a wire support member connected to a side surface of said actuator arm, said wire support member comprising:
   a fixing area for fixing said wiring structure to the side surface of said actuator arm; and
   an open area provided with an opposing surface protruding in a lateral direction of said actuator arm so as to oppose said wiring structure and adjoining said fixing area on a leading end side.

2. The rotary disk storage device according to claim 1, wherein a length of said fixing area is selected so that the length falls within a range of about 60% to 90% of an entire length of said wire support member.

3. The rotary disk storage device according to claim 1, wherein an outer front surface of said wire support member in said fixing area is substantially on the same plane as a front surface of said actuator arm adjoining thereto.

4. The rotary disk storage device according to claim 1, wherein an end portion of said open area on the leading end side terminates at a position adjacent to an end portion of said head suspension assembly on a supporting end side.

5. The rotary disk storage device according to claim 1,
   wherein said fixing area is provided with a first protruding wall having an opposing surface opposing said wiring structure and protruding in the lateral direction and a second protruding wall having an opposing surface opposing said wiring structure and protruding in the lateral direction, said wiring structure being accommodated between the opposing surface of said first protruding wall and the opposing surface of said second protruding wall; and
   wherein said open area is provided with a third protruding wall having an opposing surface opposing said wiring structure and protruding in the lateral direction, and adjoins said fixing area at an end portion of said second protruding wall on the leading end side.

6. The rotary disk storage device according to claim 5, wherein either said first protruding wall or said second protruding wall includes a separated area in a longitudinal direction.

7. The rotary disk storage device according to claim 5, wherein said first protruding wall is formed continuously with said third protruding wall in a longitudinal direction.

8. The rotary disk storage device according to claim 5, wherein each of the opposing surface of said first protruding wall and the opposing surface of said second protruding wall is provided with a surface running in parallel, and a surface inclined, with respect to a surface of said actuator arm, and the opposing surface of said third protruding wall is provided with a surface inclined with respect to the surface of said actuator arm.

9. The rotary disk storage device according to claim 8, wherein a gap is provided between the opposing surface of said third protruding wall and said wiring structure.

10. The rotary disk storage device according to claim 5, further comprising another wiring structure connected to the head, wherein said wire support member is further provided with a fourth protruding wall having an opposing surface opposing said another wiring structure and protruding in the lateral direction in said fixing area.

11. The rotary disk storage device according to claim 10, wherein the outer front surface of said wire support member in said fixing area is substantially on the same plane as each front surface of said actuator arm adjoining thereto.

12. The rotary disk storage device according to claim 1, wherein said wiring structure is formed by laminating a metal layer, an insulation layer, and a conductive layer, one on top of another.

13. The rotary disk storage device according to claim 12, wherein said head suspension assembly includes a load beam connected in an overlapping manner to a front surface of said actuator arm, a flexure connected in an overlapping manner to said load beam, and a metal layer formed in the same process as said flexure.

14. The rotary disk storage device according to claim 1, wherein said wire support member is connected to an outer side surface of said actuator arm.

15. A rotary disk storage device comprising:
a head suspension assembly provided with a wiring structure connected to a head;
an actuator assembly provided with an actuator arm connected on a leading end side to said head suspension assembly and turning said actuator arm; and
a wire support member connected to a side surface of said actuator arm, said wire support member comprising:
a slit formed in a longitudinal direction of said actuator arm; and
a wall adjoining an end portion of said slit in the longitudinal direction on a leading end side and providing an opposing surface for said wiring structure.

16. The rotary disk storage device according to claim 15, wherein said wall providing the opposing surface is a protruding wall selected from the group consisting of a protruding wall provided with a curved continuous surface, a protruding wall provided with an inclined single flat surface, a protruding wall provided with a single flat surface without inclination, a protruding wall provided with two or more steps, and a protruding wall provided with two or more flat surfaces having inclination angles different from each other.

17. The rotary disk storage device according to claim 15, wherein said slit is provided with a portion running in parallel, and a portion inclined, with respect to a front surface of said actuator arm.

18. A wire support member connected to a side surface of an actuator arm provided for a rotary disk storage device, for supporting a wiring structure connected to a head, the wire support member comprising:
a fixing area for fixing said wiring structure to the side surface of said actuator arm; and
an open area provided with an opposing surface protruding in a lateral direction of said actuator arm so as to oppose said wiring structure and adjoining said fixing area on a leading end side.

19. The rotary disk storage device according to claim 18, wherein a length of said fixing area is selected so that the length falls within a range of about 60% to 90% of an entire length of said wire support member.

20. The rotary disk storage device according to claim 1,
wherein said fixing area is provided with a first protruding wall having an opposing surface opposing said wiring structure and protruding in the lateral direction and a second protruding wall having an opposing surface opposing said wiring structure and protruding in the lateral direction, said wiring structure being accommodated between the opposing surface of said first protruding wall and the opposing surface of said second protruding wall; and
wherein said open area is provided with a third protruding wall having an opposing surface opposing said wiring structure and protruding in the lateral direction, and adjoins said fixing area at an end portion of said second protruding wall on the leading end side.

* * * * *